Dec. 8, 1953

H. F. TAPP ET AL 2,662,109

SECTIONAL HOUSING FOR ELECTRICAL CONTROL AND IGNITION APPARATUS OF FLUID FUEL BURNERS

Filed March 12, 1952

INVENTORS,
Harry F. Tapp and
Richard M. Cochrane,
BY Chapin & Neal
ATTORNEYS

Dec. 8, 1953  H. F. TAPP ET AL  2,662,109
SECTIONAL HOUSING FOR ELECTRICAL CONTROL AND
IGNITION APPARATUS OF FLUID FUEL BURNERS
Filed March 12, 1952  2 Sheets-Sheet 2

INVENTORS,
Harry F. Tapp and
Richard M. Cochrane,
BY Chapin + Neal
ATTORNEYS

Patented Dec. 8, 1953

2,662,109

UNITED STATES PATENT OFFICE 2,662,109

SECTIONAL HOUSING FOR ELECTRICAL CONTROL AND IGNITION APPARATUS OF FLUID FUEL BURNERS

Harry F. Tapp, Longmeadow, and Richard M. Cochrane, West Springfield, Mass., assignors to Gilbert & Barker Manufacturing Company, West Springfield, Mass., a corporation of Massachusetts Application March 12, 1952, Serial No. 276,206

3 Claims. (Cl. 174—52)

This invention relates to an improved sectional housing which is especially designed to receive electrical control and ignition apparatus of fluid fuel burners.

The invention is disclosed in part but not claimed in our copending application Serial No. 182,952, filed September 2, 1950.

The invention has for an object the provision of an improved sectional housing, comprising three interfitting sections, normally fastened together into one unit, within which may be received the ignition transformer and all those parts of the electrical control system for the burner that are customarily located at the burner, but not heretofore grouped together into a single unit. One housing section may contain the ignition transformer; another the control transformer, the relay and time-limit switch, all mounted on a panel, secured to the second-named housing section for easy removal and carrying on its outer face all the terminals to which wires from the exterior need to be connected, as well as wires from the interior such as the leads from the primary of the ignition transformer; and a third unit which serves as a cover for the aforesaid panel with its terminals and which is easily removable to enable the necessary electrical connections to be made. The sectional construction enables the ignition transformer to be removed and replaced independently of the control unit and the latter to be removed and replaced independently of the ignition transformer, and also convenient inspection and servicing of the various elements of the control apparatus when required.

The invention will be disclosed with reference to the accompanying drawings in which, Fig. 1 is a side elevational view showing the three sections of the housing in separated relation;

Figure 1:
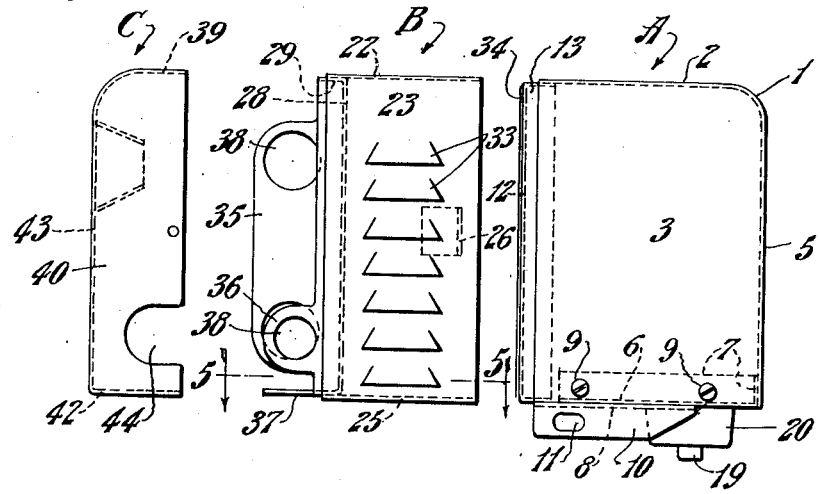
Figure 2:
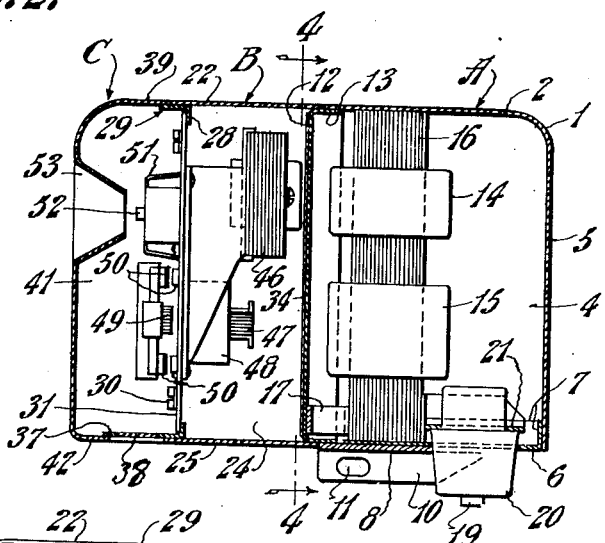
Fig. 2 is a sectional elevational view showing the housing sections in assembled relation and showing the control and ignition apparatus housed therein.

Referring to these drawings; the sectional housing construction consists of three box sections A, B and C, shown in side elevation and in separated relation in Fig. 1 and sectional elevational and assembled relation in Fig. 2.

Figure 6:
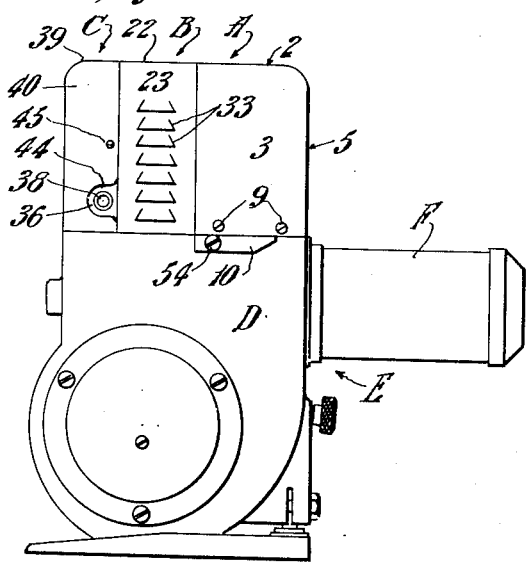
Fig. 6 is a small-scale side elevational view showing one way of mounting the housing on an oil burner.

The first section A, in the particular form herein shown, is a complete box made up of four sheet metal parts. One part 1 forms the top wall 2, two side walls 3 and 4 and one end wall 5. Another part 6 is of flat rectangular form and has along one end and two sides an upstanding marginal flange 7, which engages the end wall 5 and the side walls 3 and 4, near the lower ends thereof, and which forms a partial closure for the bottom of the box. A third part 8 comprises a flat rectangular plate which overlaps the flat part 6, at least in part, and is suitably fixed thereto, as by spot welding. The two parts 6 and 8 provide a complete bottom closure for the box. The combined parts 6 and 8 are suitably secured, as by screws 9, which pass through the lower ends of the side walls 3 and 4 and thread into the side portions of the flange 7. The plate 8 is a mounting plate and has two downturned parallel flanges 10 provided with openings 11 to receive screws, such as those shown at 54, in Figs. 6, 7 and 8 for fastening the section A to the fan housing D of an oil burner E. The fourth part of section A consists of a flat end wall 12 which has a flange 13 right-angularly turned from its four margins. This flange telescopes in part within and closely fits the peripheral enclosure provided by the walls 2, 3, 4, 6 and 8, and is suitably secured to walls 2, 3 and 4, as by spot welding for example.

Figure 4:
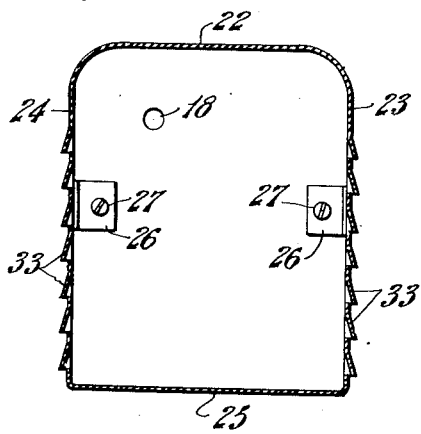
Fig. 4 is a cross sectional view taken on the line 4—4 of Fig. 2.
Figure 5:
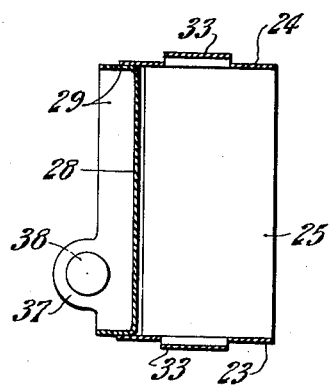
Fig. 5 is a fragmentary sectional view taken on the line 5—5 of Fig. 1.

The first box section A (Fig. 2) is adapted to contain an ignition transformer, having primary and secondary coils 14 and 15, respectively, mounted on a laminated iron core 16, which closely fits between the top wall 2 and bottom wall member 6 and is held spaced from end wall 12 by a bracket 17, fixed to core 16. The leads from the primary coil 14 are adapted to pass through an opening 18 (Fig. 4) in the end wall 12. The leads from the secondary coil 15 are suitably connected to a pair of metallic terminals 19 (Fig. 2), mounted in an insulator 20, which passes through the bottom plates 6 and 8 with the terminals 19 adapted to be suitably located in the air passage of the oil burner for connection to the ignition electrodes thereof. This insulator 20 is carried by a suitable frame 21 which is secured to the core 16. The transformer is "potted" in the first box section A by filling the latter with suitable insulating compound.

Figure 3:
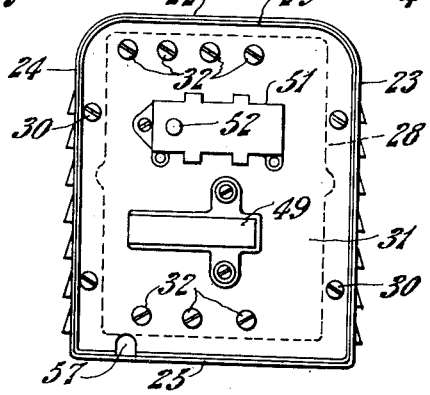
Fig. 3 is an end view, taken with the cover section removed to show the panel, the terminals carried thereby and some of the control apparatus.

The second section B is an open ended box made up of two parts. One part consists of a strip of sheet metal bent to form a top wall 22, side walls 23 and 24 and a bottom wall 25 and thus a peripheral enclosure. The ends of this strip are suitably joined, as for example, by welding them at a location intermediate the side edges of the bottom wall. These top, side and bottom walls have the same shape and the same spacing between them as the corresponding walls of the first section A so that the second section may be telescoped over the outwardly projecting part of the marginal flange 13 of the first section with a sliding fit. The end wall 12 of section A serves also as an end wall for section B. Lugs 26, suitably fixed to and projecting inwardly one from each side wall of the second section, are adapted to abut the flat end closure wall 12 of the first section and to be secured thereto, as by the screws 27 (Fig. 4), in a manner to permit convenient removal, when required. In the other end of the second section is a wall 28, which has a large opening therein and, as herein shown, is substantially annular in form. This wall has a right angularly-turned marginal flange 29, which is telescoped in part in the last-named end of the last-named peripheral enclosure wall with a close fit and which in part projects outwardly beyond such end. The flange 29 of annular wall 28 is suitably fixed to the walls 22, 23, 24 and 25, as for example by spot welding. Secured to the annular wall 28, as by the screws 30 (Fig. 3), is a panel 31, of suitable insulating material, which closes the other end of section B. This panel carries on its outer face a plurality of electrical terminals with screws 32. The second section B may, if desired, be provided in its side walls 23 and 24 with louvres 33 to enable ventilation of the chamber formed therein and dissipation of heat therefrom. The end wall 12 may have a suitable heat-insulating member 34, such as a sheet of asbestos suitably fixed thereto as by cementing for example, to prevent to some extent the passage of heat from the ignition transformer into the last-named compartment. The latter houses certain control elements, to be described, and it is desired to maintain them, as near as may be, at ambient temperature, unaffected by heat from the ignition transformer. The marginal flange 29 may have one or more extensions, such as 35, 36 and 37 from its sides and bottom, provided with knock-out plugs 38, which when removed enable the passage of the necessary wires to and from the terminals 32 on panel 31.

The third section C is an open ended box formed from a single piece of sheet metal. This section C consists of a top wall 39, side walls 40 and 41, a bottom wall 42 and an outer end wall 43. The walls, 39, 40, 41 and 42 have the same shape and the same spacing between them as the corresponding walls of the second section B and are adapted to slidably fit and telescope over the outwardly projecting portion of the marginal flange 29 of the second section B and the knock-out-bearing extensions 35, 36 and 37 thereof, the side walls 40 and 41 and the bottom wall 42 being notched, as at 44, to clear the knock-outs. Each notch 44, however, is enough smaller than the corresponding extension to provide for a small overlapping of the parts to render the enclosure dusttight. The third or cover section C is suitably secured to the second section B in a manner to permit easy removal, as for example, by a pair of screws 45, which pass through holes in the side walls 40 and 41 and thread into nuts on the side portions of the marginal flange 29.

The panel 28 supports those parts of the control apparatus that are customarily located adjacent the burner, such as the step-down control transformer 46, which is fixed to the back side of the panel; the relay, the core 47 and coil 48 of which are fixed to the back side of the panel and the armature 49 and contacts 50 of which are located on the front side of the panel; and the usual thermal safety switch 51, mounted on the front side of the panel, with its reset button 52 accessible through an opening 53 in the end wall 43 of the cover section C.

Figure 7:
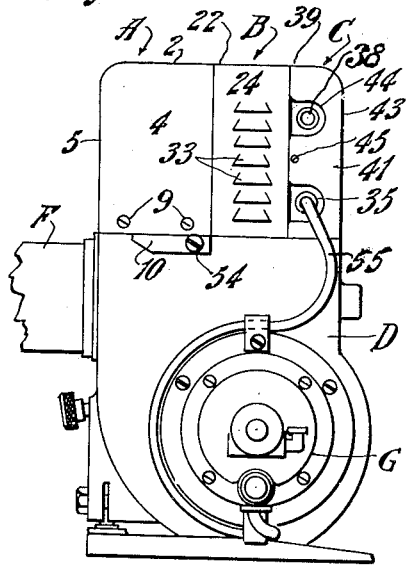
Fig. 7 is a small-scale side elevational view taken in a direction opposite to Fig. 6.
Figure 8:
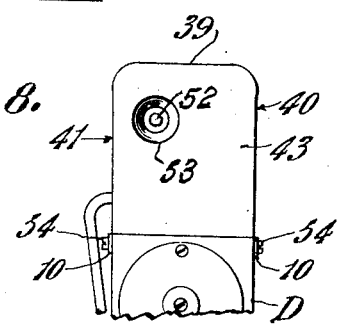
Fig. 8 is a fragmentary front elevational view of the housing.

In use, the sectional housing, assembled with the contents described, is furnished as one unit to be applied to an oil burner. In the particular illustrative example shown in Figs. 6, 7 and 8, the housing is mounted on top of the fan housing D of oil burner E with the insulator 20 and high tension terminals 19 of the transformer extending through an opening in the top wall and into the air passage leading to the air tube F of the burner so that the terminals 19 may be readily connected to the usual ignition electrodes, housed within such tube. The housing is secured to the fan casing D by two screws 54, which pass through holes 11 in flanges 10 and thread into the fan housing. In the housing is the ignition transformer and all those controls, which are customarily located at the burner. The installing workman, having removed screws 45, pulls off the cover section C and is then able to make all the necessary electrical connections. The panel 31, frame 28, flange 29 and cover C thus form a junction box. The power wires, in the form of BX cable, would ordinarily lead through the hole left when the upper knock-out plug 38, shown in Fig. 7 is removed; wires in the form of a cable 55, extend through the hole left by removal of the lower knock-out plug 38 and lead to the electric motor G of the burner, as shown. The wires within these two cables are adapted to be connected to certain terminals 32 of the lower set on panel 31. Wires from the room thermostat and from the stack thermostat may enter through the opening left by removal of the knock-out plug 38, shown in Fig. 6, and be connected to certain terminals 32 of the upper set on panel 31. It is not necessary, as it was heretofore, to run a separate BX cable from terminals 32 of the lower set to the coil 14 of the primary ignition transformer, the necessary connections being made within the housing by wires which extend through the hole 18 in end wall 12 and a notch 57 (Fig. 3) in the lower edge of panel 31 for connection to the proper terminals 32 of the lower set on panel 31. Having made these connections, the cover section C is replaced and fastened by screws 45. The housing may be mounted in any other suitable way on the oil burner so as to locate the high tension terminals of the ignition transformer within the air passage in the fan housing or in air tube F and need not necessarily be mounted on top of the fan housing, as shown.

While all the necessary control elements have been combined in one housing with the ignition transformer, the one housing is of sectional construction, thereby enabling removal of either the ignition transformer or the control unit on panel 31 and replacement of the removed unit with a new one. To remove the control unit, the cover section C is removed as described, the primary leads of the ignition transformer are disconnected from the lower set of terminals 32 on panel 31 together with the power wires and the wires which lead to motor G. The wires from the stack and room thermostats are disconnected from the terminals 32 of the upper set on panel 31, whereupon the panel, carrying all the control parts, may be removed after removing the four screws 30. To remove the ignition transformer, one proceeds in the way just described for removal of the control unit and then unscrews the two screws 27, whereupon the section A may be removed from section B and replaced with a new unit. The new section A is connected to section B by the screws 27, the panel 28 is connected to section B by the screws 30, and the primary leads from the ignition transformer, having previously been led from hole 18 forwardly and placed in the notch 57 in panel 31, are connected to the proper terminals 32. The other described electrical connections with terminals 32 are made and then the cover section C replaced and fastened as described.

The invention thus provides an improved sectional housing, which is particularly adapted for use with oil burners and which is designed to save time in installation and servicing and to permit removal and replacement of the control unit or ignition transformer unit, the one independently of the other, when desired.

What is claimed is:

1. In a sectional housing construction, a first box section adapted to house an ignition transformer and including walls forming a peripheral enclosure and closures at opposite ends of the peripheral enclosure wall, one of said closures consisting of a flat wall and a right-angularly-turned marginal flange in part telescoped in closely fitting relation within one end of the peripheral enclosure wall and fixed thereto and in part projecting outwardly beyond such end; a second box section adapted to house control apparatus for a fluid fuel burner and comprising a wall forming a complete peripheral enclosure open at one end, such end slidably fitting and being telescoped over the outwardly projecting portion of said marginal flange, and an end wall adapted to support said apparatus and having a right-angularly-turned marginal flange in part telescoped in closely fitting relation within the other end of the second-named peripheral enclosure wall and fixed thereto and in part projecting beyond the last-named end; and a third box section comprising walls providing a complete peripheral enclosure and a closure for one end thereof, the last-named peripheral enclosure wall slidably fitting and telescoping over the outwardly projecting part of the second-named marginal flange; and means for securing adjacent box sections together.

2. In a sectional housing construction, a first box section adapted to house an ignition transformer and including walls forming a peripheral enclosure and closures at opposite ends of the peripheral enclosure wall, one of said closures consisting of a flat wall and a right-angularly-turned marginal flange in part telescoped in closely fitting relation within one end of the peripheral enclosure wall and fixed thereto and in part projecting outwardly beyond such end, said flat wall having an opening therethrough adapted for the passage of the primary ignition leads of said transformer; a second box section comprising a wall forming a complete peripheral enclosure open at one end and such end having a slidable fit with and being telescoped over the outwardly projecting portion of said marginal flange, and an end wall, paralleling said flat wall and having a right-angularly-turned marginal flange in part telescoped in closely fitting relation within the other end of the second-named peripheral enclosure and fixed thereto and in part projecting beyond the last-named end thereof, a panel secured to said end wall for facile removal and adapted to support control apparatus for a fluid fuel burner, and terminals mounted on the outer face of said panel, the latter having an opening therethrough adapted to permit the passage of said ignition leads for connection to some of said terminals; and a third box section comprising walls providing a complete peripheral enclosure and a closure for one end of such peripheral enclosure wall, the latter telescoping over and slidably fitting the outwardly-projecting part of the second-named marginal flange, and means for securing adjacent box sections together for convenient removal.

3. In a sectional housing construction, a first box section adapted to house an ignition transformer and including walls forming a peripheral enclosure and closures at opposite ends of the peripheral enclosure wall, one of said end closures consisting of a flat wall and a right-angularly-turned marginal flange in part telescoped in closely fitting relation within one end of the peripheral enclosure wall and fixed thereto and in part projecting outwardly beyond such end; a second box section comprising a wall forming a complete peripheral enclosure open at one end and such end being telescoped over and slidably fitting the outwardly-projecting portion of said marginal flange, lugs on the last-named peripheral enclosure wall projecting inwardly therefrom and adapted to abut said flat wall of the first section, screws for clamping said lugs to said flat wall, and an end wall paralleling said flat wall and having a right-angularly-turned marginal flange in part telescoped in closely fitting relation within the other end of the second-named peripheral enclosure wall and in part projecting beyond the last-named end thereof, a panel fixed to said end wall and adapted to support control apparatus for a fluid fuel burner, and terminals mounted on the outer face of said panel; and a third box section comprising walls providing a complete peripheral enclosure and a closure for one end of such peripheral enclosure wall, the latter slidably fitting and telescoping over the outwardly-projecting part of the second-named marginal flange, means for fastening said panel to said end wall for facile removal, means for fastening said third section to the second section for facile removal, whereby access may be had to said panel and the terminals thereon; the first-named fastening means enabling removal of said panel and access to the control apparatus and to said screws, the latter being removable to enable separation of the first and second box sections.

HARRY F. TAPP.
RICHARD M. COCHRANE.

References Cited in the file of this patent

UNITED STATES PATENTS

| Number | Name | Date |
| --- | --- | --- |
| 1,900,595 | Weber | Mar. 7, 1933 |
| 2,240,922 | Bissell | May 6, 1941 |
| 2,436,431 | Hasselhorn | Feb. 24, 1948 |
| 2,467,377 | Giegerich et al. | Apr. 19, 1949 |
| 2,568,954 | Earl | Sept. 25, 1951 |

FOREIGN PATENTS

| Number | Country | Date |
| --- | --- | --- |
| 672,012 | France | Sept. 9, 1929 |